United States Patent
Van Metter et al.

(10) Patent No.: US 6,735,330 B1
(45) Date of Patent: May 11, 2004

(54) AUTOMATIC DIGITAL RADIOGRAPHIC BRIGHT LIGHT

(75) Inventors: Richard L. Van Metter, Washington, DC (US); Kevin S. Kohm, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 681 days.

(21) Appl. No.: 09/690,231

(22) Filed: Oct. 17, 2000

(51) Int. Cl.$^7$ .............................. G06K 9/00; G06K 9/36; G06K 9/38
(52) U.S. Cl. ................. 382/132; 382/168; 382/272; 382/284
(58) Field of Search ...................... 382/132, 167, 382/168, 190, 203, 214, 272, 282, 284; 345/581, 619

(56) References Cited

U.S. PATENT DOCUMENTS

| | | | | |
|---|---|---|---|---|
| 4,731,863 A | * | 3/1988 | Sezan et al. ................. | 382/172 |
| 5,270,530 A | * | 12/1993 | Godlewski et al. ....... | 250/208.1 |
| 5,542,003 A | | 7/1996 | Wofford ..................... | 382/132 |
| 5,633,511 A | | 5/1997 | Lee et al. ................... | 250/587 |
| 5,793,886 A | * | 8/1998 | Cok ............................ | 382/169 |
| 5,822,453 A | * | 10/1998 | Lee et al. ................... | 382/169 |
| 5,825,909 A | * | 10/1998 | Jang ........................... | 382/132 |
| 5,901,243 A | * | 5/1999 | Beretta ....................... | 382/168 |
| 6,017,309 A | | 1/2000 | Washburn et al. ......... | 600/454 |
| 6,047,042 A | | 4/2000 | Khutoryansky et al. ...... | 378/62 |
| 6,212,291 B1 | * | 4/2001 | Wang et al. ................ | 382/132 |
| 6,236,751 B1 | * | 5/2001 | Farrell ........................ | 382/168 |
| 6,285,798 B1 | * | 9/2001 | Lee ............................. | 382/260 |
| 6,323,869 B1 | * | 11/2001 | Kohm et al. ................ | 345/581 |
| 6,463,173 B1 | * | 10/2002 | Tretter ........................ | 382/168 |
| 6,594,388 B1 | * | 7/2003 | Gindele et al. ............ | 382/167 |

* cited by examiner

*Primary Examiner*—Andrew W. Johns
*Assistant Examiner*—Amir Alavi
(74) *Attorney, Agent, or Firm*—William F. Noval

(57) ABSTRACT

A method for automatically modifying the rendering of an image based on an analysis of pixel values within a selected region of interest comprising: providing a digital input image of digital pixel values and tone scale look-up table; creating a default rendered image by applying the tone scale look-up table to the input image; displaying the default rendered image; selecting a region of interest from the input image; computing the histogram of the pixel values within the region of interest; creating a bright light image by remapping the pixel values within the region of interest based on an analysis of the histogram and the tone scale look-up table; and overlaying the bright light image on the default rendered image.

16 Claims, 2 Drawing Sheets

AUTOMATIC DIGITAL RADIOGRAPHIC BRIGHT LIGHT

FIELD OF THE INVENTION

This invention relates in general to image enhancement in digital image processing and in particular to the tone scale rendering of selected regions of interest to improve the visibility of radiographic image details.

BACKGROUND OF THE INVENTION

The growing availability of information technology is having an important influence on medical imaging practice. Picture archiving and communications systems allow for digital acquisition, image processing and display for a wide variety of medical imaging modalities in a fully digital, filmless environment. The many advantages promised by digital medical imaging include increased productivity for the health care professionals who need to utilize images as part of patient care. Therefore, it is important to rapidly extract diagnostically useful information from medical images. This requires that minimal user interaction be required. When the user interaction is required with the image display, it must be rapid, intuitive and as automated as possible.

One source of medical images is the detection of x-rays projected through a region of interest of a patient so as to measure the x-ray transmittance with an imaging detector of finite area. Such images are described as projection radiographic images. Digital radiographic images often capture a wide range of x-ray exposures that must be rendered on a single image. A tone scale curve is used to selectively map code values representing a standardized input (for example, the logarithm of x-ray exposure) to standardized output (for example, optical density). A well-chosen tone scale curve provides an acceptable compromise between contrast and latitude for the overall image. However, there are often regions of the image that are rendered too dark or too light for optimal interpretation. There is a need to automatically improve the contrast and brightness of the overly dark or light areas without affecting the tone scale of the remainder of the digital image.

When printed films and a light-box are used for the display of radiographs, an ancillary small intense source of light know as a "hot light" or "bright light" is often used to better visualize dark areas of the film image. By projecting a more intense light source through the dark areas of the film, the amount of light reaching the viewer's eye is increased. This is generally found to aid visualization of structures and details in the otherwise too dark areas. The utility of a "hot light" is limited for two reasons. The area illuminated by the "bright light" is necessarily limited so that only the dark areas are illuminated. Therefore, the context of the unlighted areas of the image is lost to the viewer. There is also no contrast enhancement in the area of interest; this is desirable because the contrast of film images generally decreases at high densities. Additionally, a "bright light" is of no help for too light areas of the film and no analogous method exists to improve visualization in these areas.

When radiographic images are viewed with electronic displays, adjustment of window width and level is a standard practice used to improve the rendering of a region-of-interest. This is most often done manually by means of a mouse or track-ball and requires substantial time and effort to obtain a desired result. Window width and level adjustment requires a skilled operator to be accomplished successfully. Further, adjusting window width and level for a region of interest often has the effect of making the remaining areas of the image sub-optimally rendered. In addition to this loss of image quality, adjusting window width and level can also cause a loss of context for the region of interest.

U.S. Pat. No. 5,542,003, issued Jul. 30, 1996, inventor M. Wofford, describes a method to automatically adjust the window and level parameters for an image based on statistics of a selected region of interest. In this patent, the window and level parameters are applied to the entire image. This causes a sub-optimal rendering outside the selected region of interest and eliminates the context of the surrounding regions. Also, the algorithm does not suggest applying the contrast adjustment prior to performing the tone scale mapping. Applying the contrast adjustment after tone scale processing introduces unnecessary quantization to the enhanced region of interest.

The commercial image editing and manipulation application Adobe Photoshop (Adobe Systems Incorporated, San Jose, Calif.) provides the following technique. A region of interest in an image may be selected and an operation called "Auto Levels" performed. The selected region of interest is then processed so that the resulting histogram is linearly stretched across the available dynamic range. This is analogous to automatically selecting window/level parameters for a region of interest while leaving the remaining image unmodified. The processing operation is not performed before the tone scale mapping is applied. This results in a reduction of image quality due to quantization in the toe or shoulder regions of the tone scale. Additionally, expanding the code values of the region of interest across the entire available dynamic range can yield excessive contrast in the region of interest, creating an unnatural appearance.

U.S. Pat. No. 6,017,309, issued Jan. 25, 2000, inventors Washburn et al., disclosed a method for automatically adjusting the color map of color flow ultrasound data in a selected region of interest. As disclosed, the color flow estimates are overlaid on top of the gray scale display image, then the color map of the color flow data is automatically adjusted. Therefore, two different data sets are being viewed simultaneously.

U.S. Pat. No. 6,047,042, issued Apr. 4, 2000, inventors Khutoryansky et al., discloses an exposure control system for radiographic and fluoroscopic imaging applications based on sensor elements in a selected region of interest. This technique modifies the acquisition parameters for an image and affects the entire image globally.

SUMMARY OF THE INVENTION

According to the present invention, the drawbacks described are eliminated.

According to a feature of the present invention, there is provided an automated computationally efficient method for enhancing user selected regions of interest that may be too light or too dark to be well visulaized.

According to another feature of the present invention, there is provided a method for automatically modifying the rendering of an image based on an analysis of pixel values without a selected region of interest comprising:

providing a digital input image of digital pixel values and tone scale look-up table;

creating a default rendered image by applying said tone scale lookup table to said input image;

displaying said default rendered image;

selecting a region of interest from said input image computing the histogram of the pixel values within said region of interest; and Creating a bright light by remapping the pixel values within the said region of interest based on an analysis of said histogram and said tone scale look-up table and overlaying said bright light image on said default rendered image.

ADVANTAGEOUS EFFECT OF THE INVENTION

The invention has the following advantages.
1. The context of the original image is maintained by operating only on the selected region of interest, the remainder of the image is unchanged.
2. The image quality of the selected region of interest is improved over traditional window and level adjustment because the contrast of the selected region of interest is increased without incurring quantization due to the toe and shoulder of the tone scale look-up table application.

DETAILED DESCRIPTION OF THE INVENTION

The invention has been described in detail with particular reference to certain preferred embodiments thereof, but it will be understood that variations and modifications can be effected within the spirit and scope of the invention.

In general, the present invention automatically provides an improved rendering of a user-selected region-of-interest by remapping the pixels in the region-of-interest to a range of values that are well rendered by the tone scale curve. In this way regions of the image that have been rendered too dark are remapped to pixel values that are well rendered by the tone scale look-up table.

Likewise, regions of the image that have been rendered too light are remapped to pixel values that are well rendered by the tone scale look-up table. In this way the visibility in the region of interest is improved because their perceived contrast is increased. At the same time, no loss of visual context is suffered because the rendering of the overall image remains unaffected.

Figure 1:
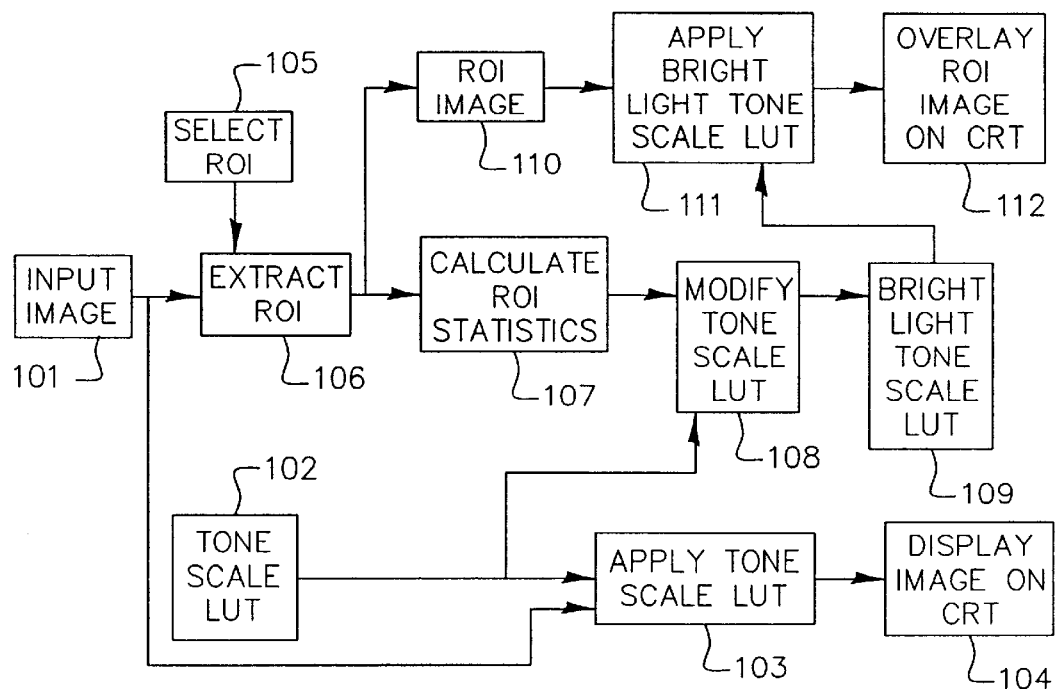
FIG. 1 is a block diagram of a digital radiographic bright light processing chain.

An environment of the present invention is shown in FIG. 1. A digital radiographic input image 101 of digital code values is selected for viewing. In the preferred embodiment, a Kodak Computed Radiography or Kodak Direct Radiography image is used. A tone scale LUT (look-up table) 102 is provided which is a default tone scale rendering to best visualize the entire dynamic range of the input image 101. Although the creation of the tone scale LUT 102 is outside the scope of the present invention, in the preferred embodiment, the tone scale LUT 102 is calculated as described by Lee et al., in "Automatic Tone Scale Adjustment Using Image Activity Measures", U.S. Pat. No. 5,633,511, issued May 27, 1997. The tone scale LUT 102 is provided to the apply tone scale LUT 103 processing step along with the input image 101. Apply tone scale LUT 103 creates a new image whereby the code values from the input image 101 are remapped through the provided tone scale LUT 102. Additional processing such as spatial enhancement and dynamic range compression may be applied to the input image 101 or the output image from the apply tone scale LUT 103 processing, however this processing is ancillary to the present invention. The image output from apply tone scale LUT 103 processing is then presented for viewing via the display image on CRT 104 module. In the preferred embodiment, apply tone scale LUT 103 processing is performed in hardware using the Barco 5MP1H Graphic Controller, manufactured by Barco Medical Imaging Systems, Korrijk, Belgium. In this case, the 12 bit input image 101 is loaded into video memory and the tone scale LUT 102 is loaded into LUT memory on the 5MP1H. The graphics hardware applies the LUT prior to display, resulting in extremely high performance over current software implementations. It will be understood that other devices can be used to carry out the invention. The rendering presented to the user at this point is optimized to visualize the entire image area. Particular regions of the image may now be selected and enhanced apart from the full image. This is the core of the bright light algorithm and is described as follows:

The user selects a region of interest, select ROI 105, that can be one of the following:
1. a circle which may be specified by a central coordinate and a radius;
2. a rectangle, which may be specified by the coordinates of two opposite corners;
3. an arbitrary polygon, which may be defined by an ordered set of vertices connected by non-intersecting straight line segments The region of interest can be selected on a digital display station by means of a pointing device such as a mouse or trackball on an imaging workstation. For example, the circle can be specified by selecting a circle icon from a menu by clicking the mouse while over that icon. The mouse is then moved to the point intended as the center of the circle where a button is depressed. The mouse is then dragged to the point that is intended to be on the circumference of the circle and the button released. The rectangle can be formed in a similar way. A rectangle icon is selected from a menu by clicking the mouse while over that icon. The mouse is then moved to one corner of the rectangle where a button is depressed. The mouse is then dragged to the point intended for the opposite corner of the rectangle and the button is released. An arbitrary polygon can be selected by first clicking the mouse over an appropriate icon on the menu. The mouse is then moved to the first intended vertex and clicked. This process is repeated for each vertex of the polygon. After each successive mouse click a line segment is shown which defines the boundary of that portion of the polygon. Double clicking at a vertex causes the polygon to be closed by connecting the last vertex point to the first.

The image region specified by the select ROI 105 step is copied from the input 101 into a ROI image 110 in the extract ROI 106 step. Next, calculate ROI statistics 107 is performed on the output of extract ROI 106. In the preferred embodiment, calculate ROI statistics 107 computes the mean of the code values from the extract ROI 106 process. In addition to the preferred embodiment described above, there are several algorithms that may be used for the calculate ROI statistics 107 processing, including:
1. The median of the acquisition code values in the region of interest can be used instead of the mean as described above.
2. A percentile measure of the acquisition code values in the region of interest can be used instead of the mean as described above. For example the $40^{th}$ percentile.

3. The mean of a fixed number of pixels oriented about the center of the ROI may be used, independent of the size of the selected ROI.

The tone scale LUT 102 is then processed by the modify tone scale LUT 108 module using the output of calculate ROI statistics 107 to create a bright light tone scale LUT 109. In the preferred embodiment, the algorithm for modify tone scale LUT 108 processing is as follows. First, an aim code value, $CV_{aim}$, is determined by finding the input code value in the tone scale LUT 102 which produces a code value output equal to the mid-level of the output range. The midlevel of the output range equals (max output CV-minimum output CV)/2, rounded to the nearest integer. The bright light tone scale LUT 109 is then calculated such that the LUT output, $CV_{out}$, equals:

$$CV_{OUT} = \text{ToneScale}LUT[CV_{IN} - \beta^*(CV_{MEAN} - CV_{aim})]$$

For all $CV_{IN}$ where ToneScaleLUT is the tone scale LUT 102, $CV_{MEAN}$ equals the value determined in calculate ROI statistics 107 and β is a constant set to 0.7 in the preferred embodiment. If the value of $CV_{IN} - \beta^*(CV_{MEAN} - CV_{AIM})$ is outside of the domain to ToneScaleLut the minimum (or maximum) input value shall be used as the index into ToneScaleLut.

Figure 2:
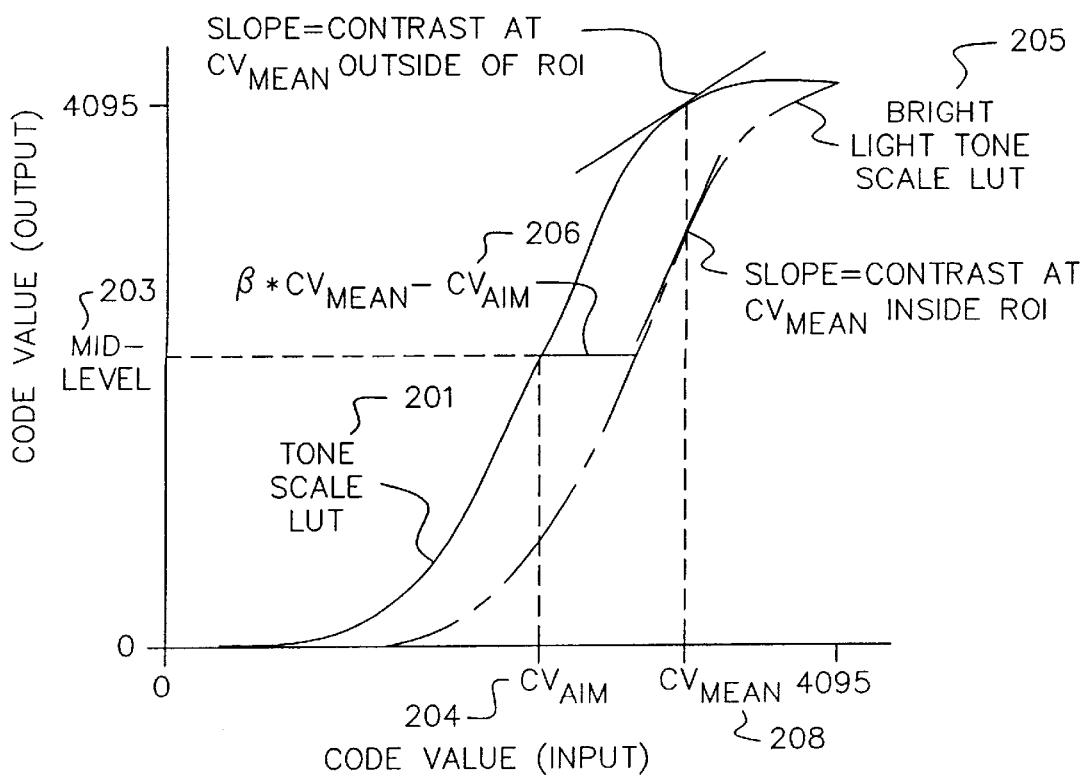
FIG. 2 is a graphical representation of notional "Modify Tone Scale LUT" processing.

A graphical example of the algorithm described above is shown in FIG. 2. An example tone scale LUT 201 is shown. This is the LUT that is applied as the initial presentation for the entire image. Also, $CV_{MEAN}$ 202 value is depicted from a hypothetical selected region of interest. First, $CV_{AIM}$ 204 is found. This is defined as the input code value that corresponds to the mid-level 203 of the output range; in the example the mid-level 203 value is (4095-0)/2, rounded to the nearest integer. $CV_{AIM}$ 204 is found by searching the tone scale LUT 201 for the input code value that yields an output of mid-level 203. The calculation of the bright light tone scale LUT 205 can be depicted by "shifting" the tone scale LUT 201 by the value of $\beta^*(CV_{MEAN} - CV_{AIM})$ 206. The increase in contrast achieved in the selected region of interest can be seen by the change in slope for the tone scale LUT 201 at an input code value of $CV_{MEAN}$ versus the slope for the bright light tone scale LUT 205 at an input code value of $CV_{MEAN}$.

Returning now to FIG. 1, the bright light tone scale LUT 109 and the ROI image 110 are used in the apply bright light tone scale LUT 111 processing to create an image for display which is then overlayed on the display by the overlay ROI image on CRT 112 process. Again, in the preferred embodiment, the Barco 5MP1H is used to perform the LUT processing for apply bright light tone scale LUT 111 in hardware. The 5MP1H also performs the overlay ROI image on CRT 112 processing. Detailed instructions for implementing display of multiple images through independent LUTs for the 5MP1H are provided in the "BarcoMed Windows NT Programmers Manual" Barco Medical Imaging Systems, Kortrijk, Belgium.

Figure 3:
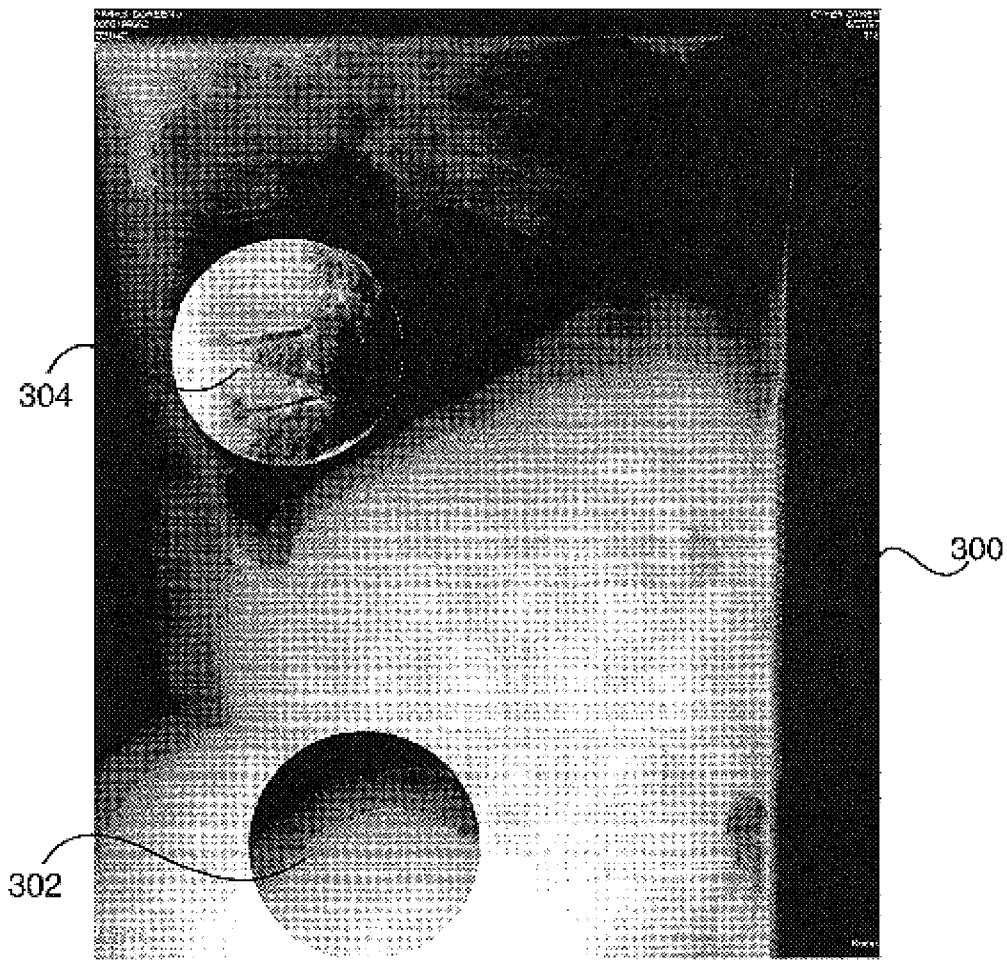
FIG. 3 is an example radiographic image with two bright light regions of interest.

The selected region of interest is now rendered at improved contrast, while the context of the radiograph is preserved. Multiple bright light regions may be created or one selected region may be scrolled across the image, while the algorithms constantly operates on the updated selected region of interest. Further, to reduce viewing flair, the tone scale LUT 102 may be modified to darken the input image 101 when the overlay ROI image on CRT 112 processing step is performed. FIG. 3 depicts an example radiographic image with two bright light regions of interest. As shown, radiographic image 300 has bright light regions of interest 302 and 304.

PARTS LIST

101 input image
102 tone scale LUT
103 apply tone scale LUT
104 display image on CRT
105 select ROI
106 extract ROI
107 calculate ROI statistics
108 modify tone scale LUT
109 bright light tone scale LUT
110 ROI image
111 apply bright light tone scale LUT
112 overlay ROI image on CRT
201 tone scale LUT
203 mid-level
204 $CV_{AIM}$
205 bright light tone scale LUT
206 $\beta^*(CV_{MEAN} - CV_{AIM})$
208 $CV_{MEAN}$
300 radiographic image
302 bright light region of interest #1
304 bright light region of interest #2

What is claimed is:

1. A method for automatically modifying the rendering of an image based on an analysis of pixel values within a selected region of interest comprising:

providing a digital input image of digital pixel values and tone scale look-up table;

creating a default rendered image by applying said tone scale lookup table to said input image;

displaying said default rendered image;

selecting a region of interest from said input image;

computing the histogram of the pixel values within said region of interest;

creating a bright light image by remapping the pixel values within the said region of interest based on an analysis of said histogram and said tone scale look-up table; and overlaying said bright light image on said default rendered image.

2. The method for automatically modifying the rendering of an image of claim 1 wherein said selecting the said region of interest is selected as one of:

a circular region defined by a center point and radius which is completely or partially contained within the image; or a rectangular region defined by two opposite corners; or a polygonal region defined by an ordered set of vertices connected by non-intersecting straight line segments.

3. The method of claim 1 wherein said remapping is performed by a look-up table operation.

4. The method of claim 1 wherein said histogram is computed using pixel values selected from only a portion of the said region of interest.

5. The method of claim 4 wherein said histogram is computed using pixel values from the central part of the said region of interest.

6. The method of claim 4 wherein said central part of the said region of interest has the same shape as the said region of interest.

7. The method of claim 1 wherein said histogram representing the said region of interest is computed from a sub-sampling of the original image pixel values.

8. The method of claim 1 wherein said analysis is the mean of the pixel values in said region of interest.

9. The method of claim 1 wherein said analysis is the median of the pixel values in said region of interest.

10. The method of claim 1 wherein said analysis is based on one or more percentile measures of the pixel values selected from said histogram.

11. The method of claim 10 wherein said analysis is based on the difference between one or more percentile measures of the said histogram and one or more aim values.

12. The method of claim 11 wherein said analysis is based on the difference between the mean of the pixel values of said histogram and an aim value.

13. The method of claim 1 wherein said bright light image is created by remapping the pixel values within the said region of interest based on an analysis of said histogram and said tone scale look-up table in graphics hardware.

14. The method of claim 1 wherein said overlaying said bright light image on said default rendered image is performed in graphics hardware.

15. The method of claim 1 wherein said tone scale look-up table is first modified to darken the said input image.

16. A computer storage product for use with a digital computer for storing software for carrying out the method of claim 1.

* * * * *